United States Patent [19]

Schukrafft

[11] 3,749,508
[45] July 31, 1973

[54] BORING MACHINES
[75] Inventor: Friedrich Schukrafft, Bietigheim, Germany
[73] Assignee: Ludwigsburger Maschinenbau GmbH, Ludwigsburg, Germany
[22] Filed: Aug. 9, 1971
[21] Appl. No.: 170,104

[30] Foreign Application Priority Data
Aug. 12, 1970 Germany............... P 20 40 020.8

[52] U.S. Cl................... 408/156, 408/11, 408/156, 408/159, 408/180
[51] Int. Cl...................... B23b 29/034, B23b 51/00
[58] Field of Search.................... 408/180, 159, 156, 408/154, 714, 155, 168, 13, 11, 8

[56] References Cited
UNITED STATES PATENTS
2,412,038  12/1946  Freisen ............................... 408/156
2,734,402  2/1956  Hoern ..................................... 90/18
2,438,741  3/1948  Coulson ............................. 408/154

Primary Examiner—Gil Weidenfeld
Attorney—Richard Low and Murray Schaffer et al.

[57] ABSTRACT

Apparatus for supporting the boring or cutting tools of a boring machine comprising a rotatable spindle, a carrier mounted at one end of the spindle, and a tool holder extending from the carrier. An arm extends rearwardly from the tool holder into engagement with means for pivoting it. A tool holder is connected to the carrier by at least one torsion bar spring defining the swing axis of the tool holder and exerting a restorative force when twisted.

7 Claims, 4 Drawing Figures

Inventor:
FRIEDRICH SCHUKRAFFT

BORING MACHINES

BACKGROUND OF THE INVENTION

The present invention relates to drilling and boring units for fine precision work and in particular with apparatus and system for mounting the chisels or work tools on a holder therefor so that they might be deviated along a swing axis.

In drilling and boring machines of the type here under discussion, a rotatable spindle is provided with tool holder at its outer end. The tool holder is swingable in a transverse direction with respect to the spindle axis. The tool holder carries at least one cutting tool and is provided with elongated arm by which it is deviated from the spindle axis. The arm generally extends into the central bore of the spindle and collaborates with an adjustment member axially slideable within the spindle. The adjustment member acts on the swing arm to swing or deviate the tool holder about the swing axis. Resilient spring means are provided to maintain and to urge the tool holder back to its original position.

In the known constructions of boring machines of this type, the resilient spring returning action on the swing arm is produced by such spring means as compression or coil springs. In most cases the spring elasticity is not sufficient, particularly at the high speed rotation of the spindle, to keep the tool holder in the desired angular position preset by the swing adjustment mechanism. Because of this instability, high speed rotation does not produce the accuracy and precision required for the fine boring work necessary in modern technology.

It is the object of the present invention to provide means for holding boring tool of the type described which overcomes the defects of the known construction and which provides for the precision and accuracy needed. It is a further object of the present invention to provide an adjustable tool holder having a sufficiently large resilient restorative force enabling the stabilization of the tool holder at high rotational speeds in its preset position.

Further advantages and objects of the present invention will be obvious from the following disclosure.

SUMMARY OF THE INVENTION

According to the present invention, a tool holder is connected by a spindle head by at least one torsion bar spring defining the transverse swing axis for the adjustable swing of the holder.

According to the present invention apparatus is provided for supporting the boring or cutting tools comprising a rotatable spindle, a carrier mounted at one end of the spindle, and a tool holder extending from the carrier. An arm extends rearwardly from the tool holder into engagement with means for pivoting it. The tool holder is connected to the carrier by at least one torsion bar spring defining the swing axis of the tool holder and exerting a restorative force when twisted.

Preferably two torsion bars are provided arranged diametrically opposed to each other. To effect this the carrier is formed with an outer ring flange and an inner body portion receiving the tool holder. The two torsion bars being formed along an axis transverse to the spindle axis and to the plane in which the arm is pivoted.

Adjustable means for pivoting the arm is provided comprising a linearly moveable rod which is bifurcated to encompass the arm. The rod is provided with a wedge surface which variously pivots the arm when the rod is reciprocated.

Other features and full details of the present invention are disclosed in the following description as shown in the accompanying drawings.

DESCRIPTION OF INVENTION

Only some of the details of a drilling and boring machine as is necessary to illustrate the inventive tool holder is shown and described. The general construction of boring and drilling machines including the means for driving the spindle, regulating the speed and direction of the drill and other well-known features are omitted from this disclosure for the sake of brevity and conciseness.

Figure 1:
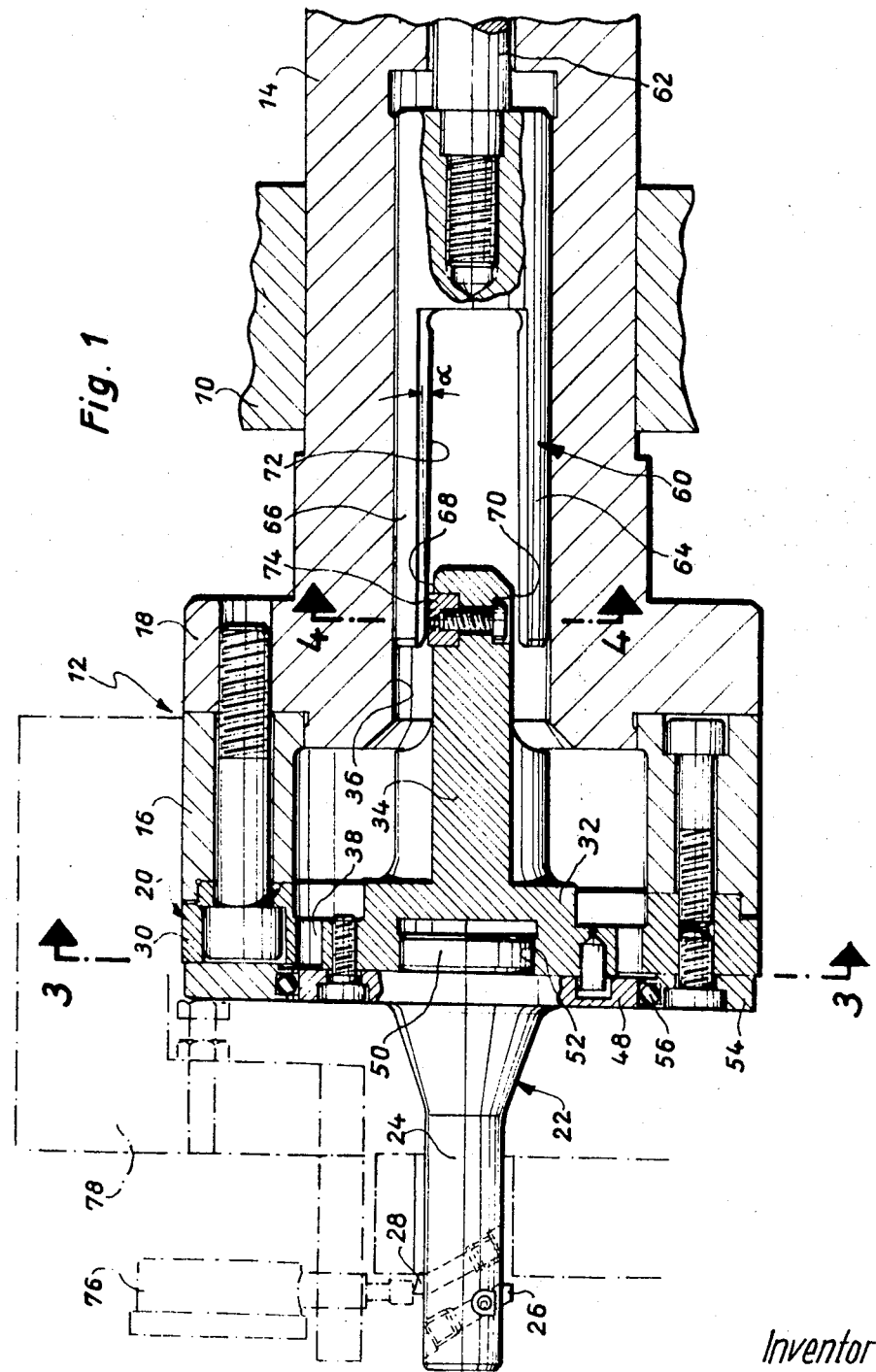
FIG. 1 is a longitudinal section through a spindle head of a boring machine made in accordance with the present invention.

Turning now to FIG. 1, only the forwardmost bearing of the two or more bearings needed to journal the rotating drive spindles generally depicted by the numeral 12 is shown. The spindle comprises a hollow shaft 14 journalled at its rearmost end within the bearing 10 and several individual part, namely: a hollow cylindrical sleeve 16 which is fixed at its rear edges by suitable screw or bolts to the frontal face of a radially extending flange 18. Mounted by the same screw or bolts to the frontal edge of the cylinder 16 is a tool holder carrier generally defined by the numeral 20. The carrier 20 is adapted to receive in a recess concentric of its central axis a tool holder generally defined by the numeral 22 which comprises a forwardly extending elongated shaft 24 at the outermost end of which two chisels or cutting tools 26 and 28 are inserted. The cutting tools are set in opposite directions and are transversely adjustable with respect to the surface of the shaft 24. On rotation of the spindle 12 the chisels cut a hole in a workpiece along a predetermined path, determined in part by the angular disposition given to the tool holder 22 by the positioning of the carrier 20.

Figure 3:
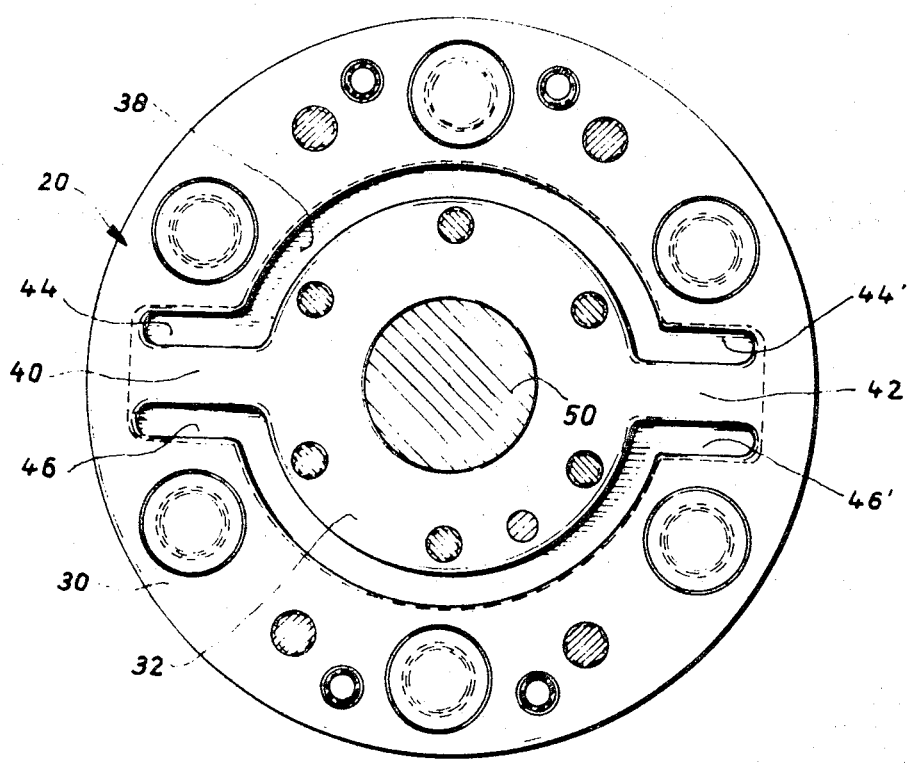
FIG. 3 is a sectional view taken along lines 3—3 of FIG. 1 in a larger scale than FIG. 1.
Figure 4:
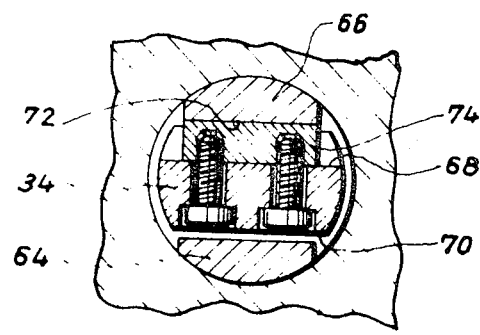
FIG. 4 is a sectional view taken along line 4—4 of FIG. 1, also enlarged.

The carrier 20 comprises a flat circular disc-like outer flange portion 30 and a central body portion 32 from which an integral arm, constituting the lever arm of the carrier, extends rearwardly. The lever arm 34 extends within the central bore 36 of the spindle shaft 14. A pair of diametrically opposed cutout portions 38 are formed in the carrier 20 between the outer flange 30 and the inner body 32. As seen in FIG. 3 the grooves 38 have an arcuate central section and a pair of laterally extending radial slits 44, 46, and 44', 46'. The central body portion 32 is thus connected to the outer flange portion 30 by a pair of radially extending wing-like lateral members 40 and 42 which because of the groove 38, constitute a torsion bar spring. The lateral members 40 and 42 are diametrically opposed to each other and lie crosswise of the carrier 20 along the axis transverse to the axis of the swing arm 34. The slots 38 and the lateral slots 40, 46, and 44', 46' are sufficiently wide to provide a degree of radial play between the inner body portion 32 and the outer annular flange portion 30 as well as to permit the body 32 to resiliently twist or flex about the transverse axis running through the torsion bars 40 and 42.

The carrier, as seen in the preceeding description, can in its entirety be fashioned from a single piece of bar stock including the rearwardly directed arm 34 and then enlarged central body portion 32. The arcuate grooves 38 and the slits 44, 46, and 44', 46' can all be symmetrically cut from the single workpiece to provide the structure shown.

The tool holder 22 is itself provided with an enlarged rearward directed end 50 which seats within a socket 52 formed concentrically in the frontal face of the body portion 32 ofthe carrier 20. The tool holder 22 is also provided with a radially extending retaining flange 48 which seats against the frontal face and edge of the body portion 32 so as to be firmly seated hereon. A retaining flange 48 is fastened to the body portion 32 of the carrier 20 by suitable screw means. An outer centering or coping ring 52 is provided which is itself screwed to the frontal face of the flange portion 30 of the carrier 20. The inner circumference of the centering ring 54 is grooved or undercut and is provided with a sealing washer such as resilient O-ring 56 which acts to seal the space between the centering ring and the retaining plate 48. The washer 56 prevents dirt, oil, metal chips, and other contaminants from reaching the interior of the spindle head.

The lever arm 34, extending from and integral with the body 32 of the carrier 20, extends as mentioned earlier into the bore 36 of the spindle shaft 14. Extending from the machine proper, or from the other end of the shaft 14, into the bore 36 and in engagement with the arm 34 is a swing adjustment member generally defined by the numeral 60. A rotary to linear translating mechanism including a bar 62 provided with a screw at its frontal end is threaded within a central bore in the rear end of the swing adjustment member 60. The bar 62 is connected to conventional control means whereby it may be rotated to effect the linear adjustment of the swing adjustment member 60. The adjustment member 60 comprises an elongated bar, bifurcated along its longitudinal axis and having a pair of opposed arms 64 and 66 extending in the direction of an actually overlapping the lever arm 34. At its rearward end the lever arm 34 is provided with two flat faces 68 and 70, conforming to and cooperating with the interior surfaces of the arms 64 and 66 of the adjustment member 60. One of the forked arms of the adjustment member 60, namely: the arm 66 is provided with an inclined surface 72 directed toward the flat side 68 of the lever arm 34. As seen in FIG. 1, the inclined surface 72 is larger at its rearward end opening in an angle in that direction, forming a wedge which coacts with a slide insert piece 74 inset into arm 34. The slide piece 74 is made of hard metal material and is set within a groove in the flat surface 68 of the arm 34 by a set screw. It is to be noted that the dimensions of the space between the inner surfaces of the bifurcated arms 64 and 66 and the distance between the surfaces 68 and 70 of the swing arm 34 are such that a small space remains between the surface of the bifurcated arm 64 and the flat surface 70 of the arm 34. That is, that a distance is maintained between these two surfaces which permits the swing adjustment member 60 and the arm 34 to pivot relatively to each other about a fulcrum point associated with the slide piece 74. To permit ever greater pivoting the heel of the lever arm is bevelled. It is to be noted that the flat surfaces 68 and 70 are in a direction transverse to that of the axis of the torsion bar and in a plane perpendicular to an axis drawn through the center of the arcuate cut out portions 38.

Figure 2:
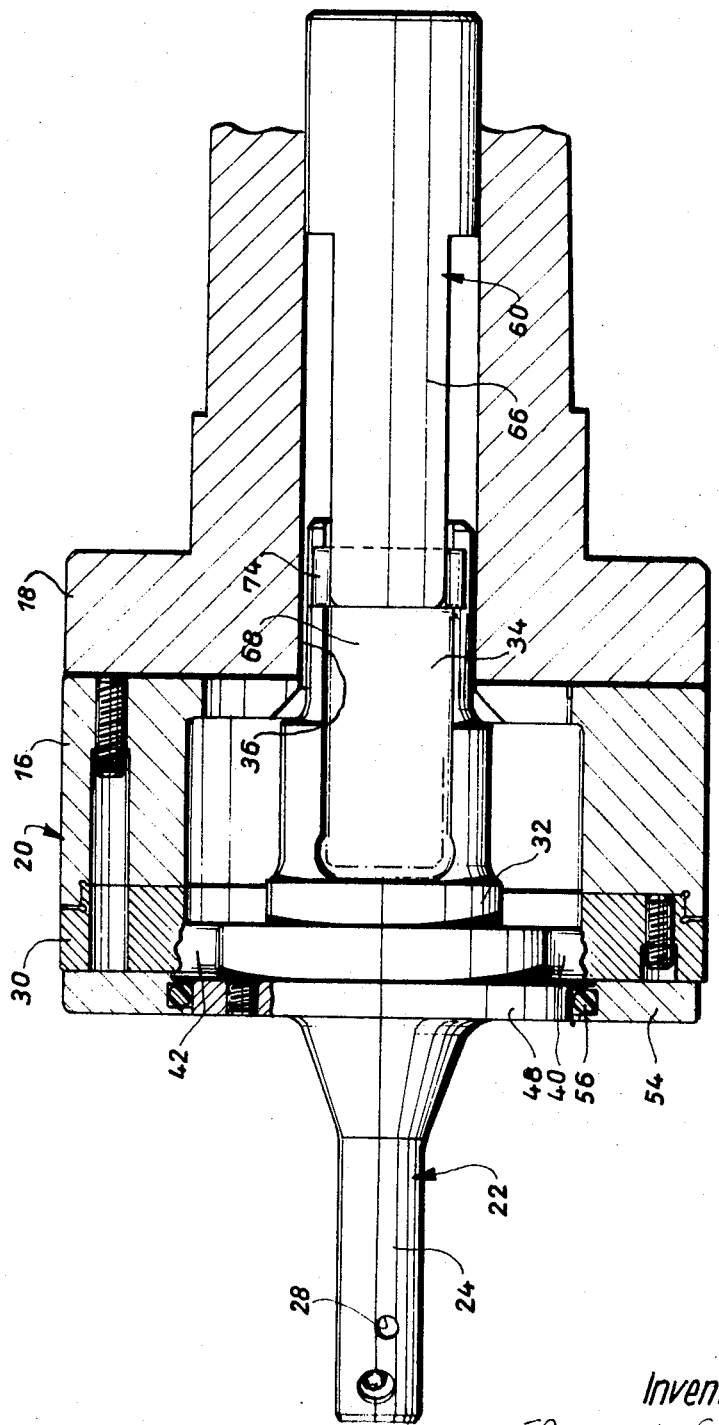
FIG. 2 is a view similar to that of FIG. 1 turned by 90° about the longitudinal axis of the device.

As indicated in FIG. 2, the adjustment member is reciprocably movable virtually the entire distance over the flattened portions of the lever arm 34 from a rearmost position shown in the full lines to the forwardmost position shown in the dot-dash lines. Thus, because of the inclined planar surface 72, coacting with the wedge piece 74, the lever arm 34 can be made to pivot or turn and in turn itself cause the body portion 32 of the carrier 20 to pivot in an axis through the torsion bar springs 40 and 42. The torque created in the torsion bar is so effective that any deviation from the preset adjusted position created by the member 60 pivoting the arm 34 will be overcome and the tool holder will thereby maintain its angular direction throughout the cutting operation. Consequently the tool holder 22 is adjustable in the radial direction by even the smallest amounts and held therein by the adjustment member 60. The bar springs 40 and 42 thus revolve or twist about their axis, twisting the material of which they are made and thereby automatically setting up a resilient restoring torque of a force sufficient to tend to return the body 32 to its original normal rest position.

The automatic restoring action can be controlled by the use of a sensing device 76 indicated in the dot-dash lines in FIG. 1. The sensing device may be fastened to a holder 78, which can be fixedly attached to the outer surface of the spindle head. The holder 78 may, for example, also be magnetic and therefore be self-adherent to the spindle head. The sensing device can sense the angular position of the working tools 26 and 28 and therefore the position of the head 22 and produce a signal which may be converted to control the adjustment shaft 62 positioning the control member 60 as desired selectively along the swing arm 34 to effect the desired compensation and perfect operation.

It will thus be seen from the foregoing description of the present device that the tool holder 22 is secured within a central body portion 32 which is connected to the main carrier 20 by at least one torsion bar spring defining the swing axis of the tool holder. Through the use of such a torsion bar spring device, the spindle head has considerably larger resilient and restorative powers allowing the spindle head to be turned and preset to the operating position and maintained there during cutting at a faster and securer rate than with the use of the customary coil or compression springs. The torsion bar spring has a progressively increasing stiffness and torque resulting from the increase of stress placed upon it. Thus the more the lever arm increases in angular deviation from its normal position, the greater the restoring torque created. Thus even considerably short or small angular deviations and even at extraordinarily high speeds of rotation, the spindle head may be stabilized quickly and efficiently.

Various modifications of the preceeding construction can be made. It is, for example, possible to use a round rod rather than a bar shaped member for the torsion spring. The round rod may be formed in the same manner as a rectangular bar as previously described, i.e., as an integral part of a one piece carrier member. On the other hand, the carrier 20 may be made of several pieces with the round bar stock anchored both in the central body portion and the outer flange member. The povision of a pair of oppositely arranged torsion springs is most advantageous since this construction is simple and provides the symmetry and stability necessary under high speed rotation.

The aforementioned construction has the further advantage of permitting an effective seal through the use of an O-ring washer between the radially outer centering ring member and the inner flange member retaining ring of the holder 22. This arrangement permits the holder 22 to be easily removed and replaced with a similar unit, without having to dissassemble the entire spindle head. The new tool holder can be replaced in the socket 52 of the body 32 of the carrier 20 and an O-ring 56 easily inserted.

The bifurcated adjustment member 60 has the further advantage in that its shape and form does not require the use of any external or extra mass compensating means. Under normal conditions, the known means for swinging the tool holder would create an imbalance of the mass in the rotating spindle and mass compensating means would have to be provided. Because the lever arm 34 extends between the bifurcated arms of the adjustment member 60, one of the arms form the adjustment wedge or inclined surface while the other arm can be built to compensate for the added weight.

What is claimed

1. Apparatus for supporting the tool of a boring device, comprising a rotatable spindle having a central axis, a carrier mounted at one end of said spindle, a tool holder extending from said carrier and holding said boring tools, an arm extending rearwardly from said tool holder, means engaging said arm for swinging said arm to pivot said tool holder within said carrier, said tool holder being connected to said carrier by a pair of diametrically opposed torsion bar springs extending along an axis transverse to the axis of said spindle defining the swing axis of said tool holder and exerting a restoring torque force thereon when twisted.

2. The apparatus according to claim 1 wherein said spindle is hollow having a central longitudinal bore into which the arm extends and wherein the means for swinging said arm comprises a linearly reciprocable rod engaging said arm, said rod and said arm having cooperating wedge surfaces adapted to adjust the position of said arm on movement of said rod.

3. The apparatus according to claim 2 including means for automatically reciprocating said adjustment rod.

4. The apparatus according to claim 1 including a head at the frontal end of said spindle, the carrier comprising an outer ring flange secured to said head, and an inner body spaced from said flange and adapted to support the tool holder, said body being connected to said ring flange by said pair of diametrically opposed torsion bar springs integrally secured to both said ring flange and said body and forming the swing axis of said tool holder, said body having the rearwardly extending arm integrally formed therewith.

5. The apparatus according to claim 1 wherein the body has a central opening in its frontal face adapted to receive the tool holder, said tool holder including an annular flange and means securing said flange to said body.

6. The apparatus according to claim 5 including a centering ring encompassing the flange of the tool holder, said centering ring being secured to the ring flange of the carrier and including washer means seated between said centering flange and the tool holder flange to seal the same.

7. The apparatus according to claim 2 wherein the adjustment rod comprises a bifurcated member in which the arm is received, one of the bifurcated arms having an inclined surface forming a wedge adjacent one surface of said arm, a slide member secured to the one surface of said arm to engage said wedge.

* * * * *